(12) United States Patent
Surineni et al.

(10) Patent No.: US 8,374,192 B2
(45) Date of Patent: Feb. 12, 2013

(54) POWER SAVE ENHANCEMENTS FOR WIRELESS COMMUNICATION

(75) Inventors: Shravan K. Surineni, Waltham, MA (US); Arnaud Meylan, San Diego, CA (US); Ajay Dassu, Waltham, MA (US)

(73) Assignee: Qualcomm Incorporated, San Diego, CA (US)

( * ) Notice: Subject to any disclaimer, the term of this patent is extended or adjusted under 35 U.S.C. 154(b) by 644 days.

(21) Appl. No.: 11/871,874

(22) Filed: Oct. 12, 2007

(65) Prior Publication Data

US 2008/0095091 A1    Apr. 24, 2008

Related U.S. Application Data

(60) Provisional application No. 60/862,146, filed on Oct. 19, 2006.

(51) Int. Cl.
    *H04L 12/42* (2006.01)
(52) U.S. Cl. ......... 370/449; 370/346
(58) Field of Classification Search ......... 370/338, 370/449, 346, 395.4; 340/3.51
    See application file for complete search history.

(56) References Cited

U.S. PATENT DOCUMENTS

| | | | |
|---|---|---|---|
| 6,917,598 B1 | 7/2005 | Emeott et al. | |
| 7,433,670 B2 | 10/2008 | Beveniste | |
| 7,558,225 B2 * | 7/2009 | Nakajima et al. | 370/310 |
| 7,688,772 B2 * | 3/2010 | Sinivaara et al. | 370/318 |
| 7,693,117 B2 * | 4/2010 | Benveniste | 370/338 |
| 7,881,322 B1 * | 2/2011 | Benveniste | 370/414 |
| 2005/0152324 A1 | 7/2005 | Benveniste | |
| 2005/0249227 A1 | 11/2005 | Wang | |
| 2005/0288070 A1 | 12/2005 | Omori et al. | |
| 2007/0230408 A1 * | 10/2007 | Trainin et al. | 370/338 |

FOREIGN PATENT DOCUMENTS

| | | |
|---|---|---|
| JP | 2005026862 A | 1/2005 |
| JP | 2005287040 A | 10/2005 |
| JP | 2006197032 A | 7/2006 |
| JP | 2008509599 A | 3/2008 |
| RU | 2242091 C2 | 12/2004 |
| WO | 2004095860 A1 | 11/2004 |

OTHER PUBLICATIONS

"IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Std. 802.11, 1999 Edition.

(Continued)

*Primary Examiner* — Chandrahas Patel
(74) *Attorney, Agent, or Firm* — Qualcomm Patent Group; James H. Yancey, Jr.

(57) ABSTRACT

Techniques for improving power saving by stations in wireless networks are described. In an aspect, a source station sends a frame with a buffer status for a recipient station during an awake time for both stations and sends one or more data frames to the recipient station as indicated by the buffer status. The recipient station knows how many data frames to expect based on the buffer status and can go to sleep after receiving the expected number of data frames. In another aspect, a source station receives a frame with information on transmission opportunity (TXOP) bursting receive capability of a recipient station operating in a power save mode. The source station performs channel access at the start of a TXOP and sends multiple data frames in the TXOP to the recipient station based on the TXOP bursting receive capability of the recipient station.

32 Claims, 11 Drawing Sheets

OTHER PUBLICATIONS

"Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHZ Band."" IEEE Std. 802.11a-1999 (Supplement to IEEE Std 802.11, 1999)".

"Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4GHz Band,"" IEEE Std 802.11b-1999 (Supplement to ANSI/IEEE Std. 802.11, 1999 Edition)".

"Draft Supplement to Standard For Telecommunications and Information Exchange Between Systems -LAN/MAN Specific Requirements -Part 11: Wireless Medium Access Control (MAC) and physical layer (PHY) specifications: Medium Access Control (MAC) Enhancements for Quality of Service (QoS),"" IEEE Std 802.11e/D3.0, May 2002 (Draft Supplement to IEEE Std 802.11, 1999 Edition)".

"IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band," IEEE Std 802.11g—2003.

IEEE 802.11n/D1.0 Draft Amendment to Standard [FOR] Information Technology—Telecommunications and Information exchange between systems—Local and Metropolitan networks—specific requirements Part11 : Wireless LAN Medium Access Control (MAC) and Physical Layer (PHY) specifications: Enhancements for Higher Throughput, IEEE P802.11n/D1.0, Mar. 2006, XP-002469313.

IEEE Standard for Local and metropolitan area networks, Part 16: "Air Interface for Fixed Broadband Wireless Access Systems", IEEE Std 802.16—2001.

IEEE 802.20, Jan. 2006 Draft Standard for Local and Metropolitan Area Networks—Standard Air Interface for Mobile Broadband Wireless Access Systems Supporting Vehicular Mobility—Physical and Media Access Control Layer Specification.

IEEE P802.11s/D1.07: "Draft Standard for Information Technology—Telecommunications and information exchange between systems—Local and metropolitan area networks—Specific requirements—Part 11: Wireless LAN Medium Access Control (MAC) and Physical Layer (PHY) specifications: Mesh Networking" Sep. 2007.

International Search Report PCT/US07/081562, International Search Authority, European Patent Office.

Written Opinion—PCT/US07/081652—International Search Authority—European Patent Office.

Taiwan Search Report—TW096139320—TIPO—Apr. 13, 2011.

European Search Report—EP09075454—Search Authority—Hague—Feb. 11, 2010.

Office Action in Japanses application 2009-533488, corresponding to U.S. Appl. No. 11/871,874, citing JP2005287040A, WO2004095860A1, JP2005026862A, and JP2008509599A. Dated Sep. 18, 2012.

* cited by examiner

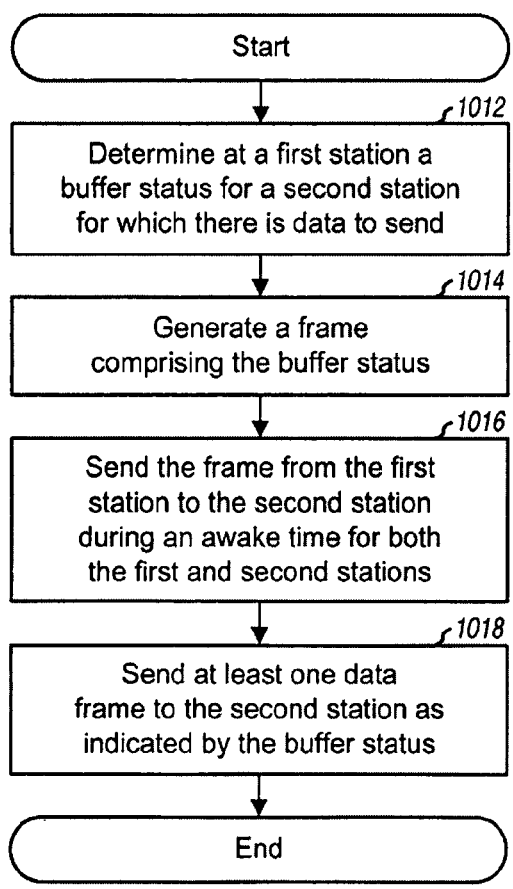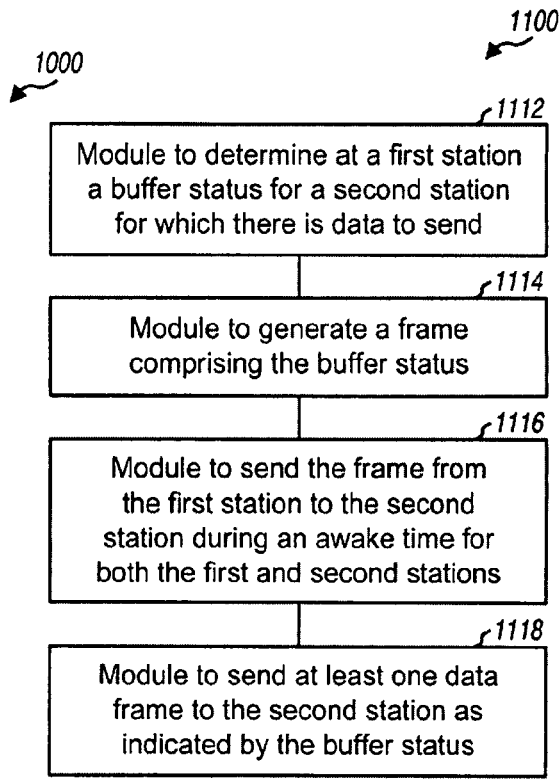
FIG. 10
FIG. 11

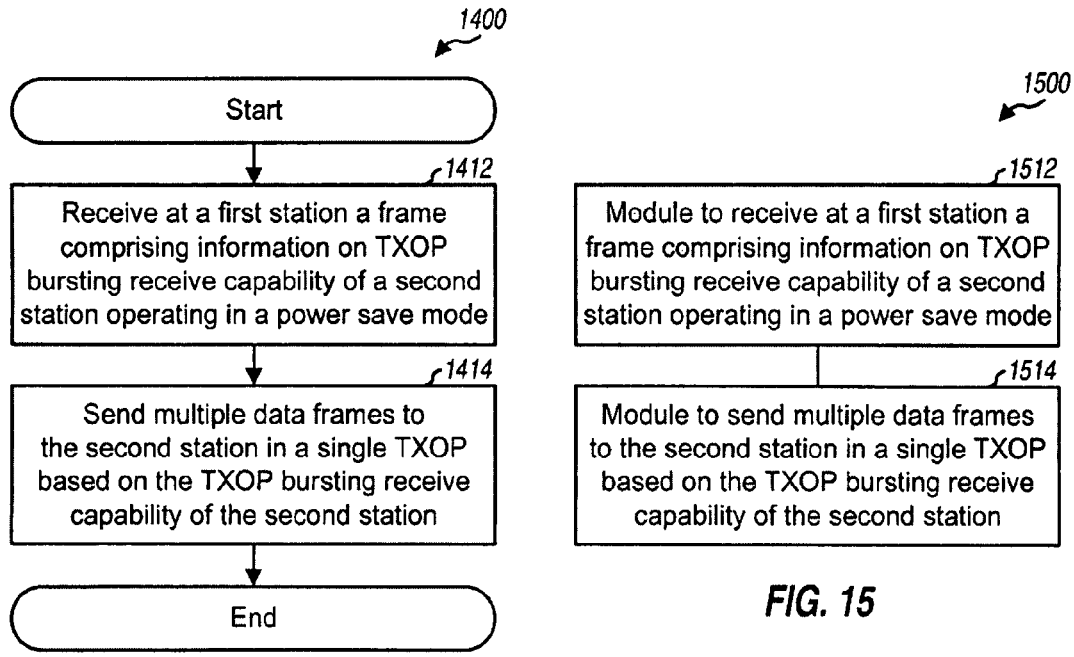
FIG. 14
FIG. 15
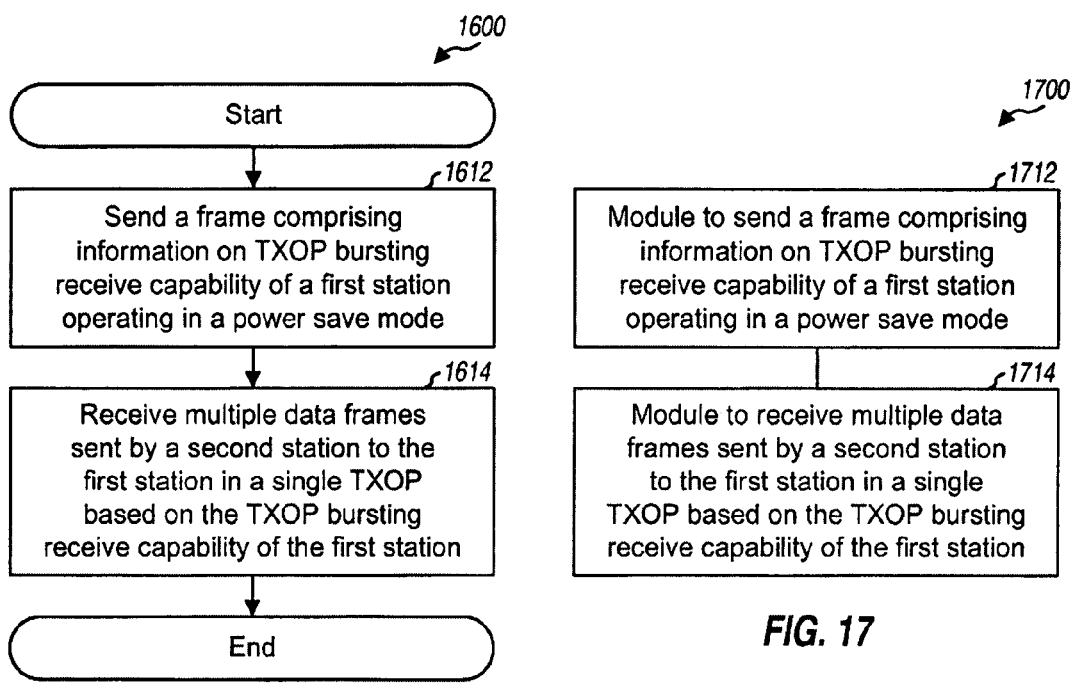
FIG. 16
FIG. 17

POWER SAVE ENHANCEMENTS FOR WIRELESS COMMUNICATION

The present application claims priority to provisional U.S. application Ser. No. 60/862,146, entitled "POWER SAVE ENHANCEMENTS FOR AD-HOC WIRELESS COMMUNICATION," filed Oct. 19, 2006, assigned to the assignee hereof and incorporated herein by reference.

BACKGROUND

I. Field

The present disclosure relates generally to communication, and more specifically to techniques for improving battery life of stations in wireless communication networks.

II. Background

Wireless communication networks are widely deployed to provide various communication services such as voice, video, packet data, messaging, broadcast, etc. These wireless networks include wireless wide area networks (WWANs) that provide communication coverage for very large geographic areas, wireless metropolitan area networks (WMANs) that provide communication coverage for large geographic areas, wireless local area networks (WLANs) that provide communication coverage for medium geographic areas, and wireless personal area networks (WPANs) that provide communication coverage for small geographic areas. Different wireless networks typically have different capabilities, requirements, and coverage areas.

A station (e.g., a cellular phone) may be capable of communicating with one or more wireless networks (e.g., a WWAN and/or a WLAN). The station may be portable and powered by an internal battery. The station may consume battery power whenever it is turned on, e.g., to transmit and/or receive data. It is desirable to reduce battery power consumption as much as possible in order to extend both standby time between battery recharges and operating time when the station is exchanging data. There is therefore a need in the art for techniques to improve battery life of the station.

SUMMARY

Techniques for improving power saving by stations in wireless networks are described herein. In an aspect, a source station may include a power save buffer status in a frame sent to a recipient station. The recipient station may operate in a power save mode and may be awake for only some of the time. The buffer status may indicate the number of data frames to be sent to the recipient station. The source station may send one or more data frames to the recipient station as indicated by the buffer status. The recipient station may know how many data frames to expect from the source station based on the buffer status. The recipient station may go to sleep after receiving the expected number of data frames, which may save battery power. In general, the source station may indicate the amount of buffered data based on any unit such as number of data frames, number of bytes, number of bits, etc. The recipient station may know how much data to expect based on the amount of data indicated by the buffer status.

In another aspect, a recipient station capable of receiving multiple data frames in one transmission opportunity (TXOP) can advertise this TXOP bursting receive capability to other stations. In one design, the recipient station may send a frame comprising information on the TXOP bursting receive capability of the station. This information may indicate the number of data frames that can be received by the recipient station in a single TXOP. The recipient station may thereafter receive multiple data frames from a source station in one TXOP based on the TXOP bursting receive capability of the recipient station. The source station may perform channel access at the start of the TXOP and may send all data frames in the TXOP without the need to perform another channel access.

The power save buffer status and TXOP bursting features may be used for various power save modes and various wireless networks, as described below. Various aspects and features of the disclosure are also described in further detail below.

BRIEF DESCRIPTION OF THE DRAWINGS

FIGS. 10 and 11 show a process and an apparatus, respectively, for transmitting data with power save buffer status.

FIGS. 14 and 15 show a process and an apparatus, respectively, for transmitting data with TXOP bursting capability.

FIGS. 16 and 17 show a process and an apparatus, respectively, for receiving data sent with TXOP bursting capability.

DETAILED DESCRIPTION

The techniques described herein may be used for various wireless networks such as WLANs, WMANs, WWANs, WPANs, etc. A WLAN may implement IEEE 802.11, Hiperlan, etc. A WWAN may be a cellular network such as a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A WMAN may implement IEEE 802.16 (which is commonly referred to as WiMAX), IEEE 802.20, etc. A WPAN may implement Bluetooth. For clarity, the techniques are described below for an IEEE 802.11 WLAN.

Figure 1:
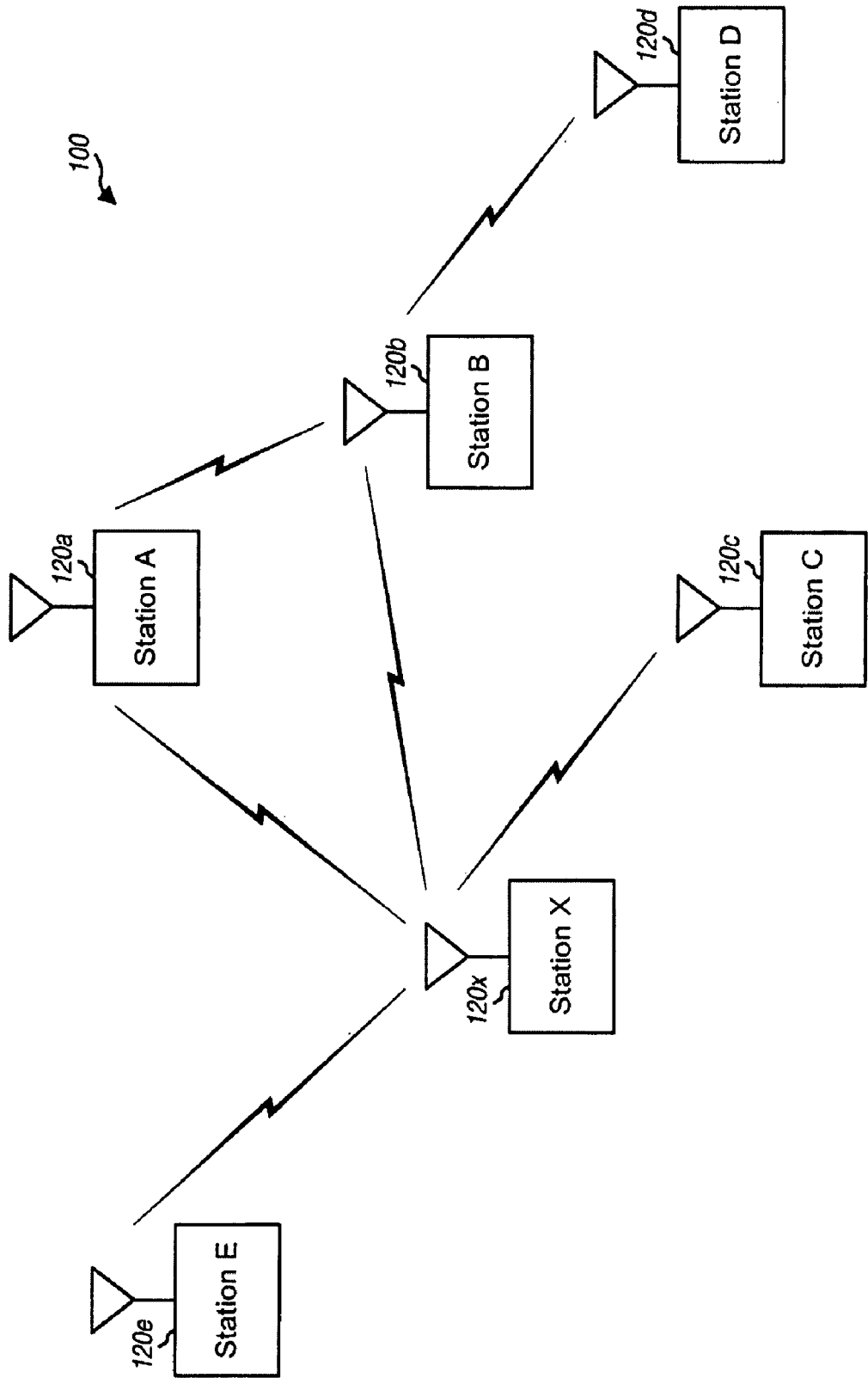
FIG. 1 shows a wireless network.

FIG. 1 shows a wireless network 100 with multiple stations 120. In general, a wireless network may include any number of access points and any number of stations. A station is a device that can communicate with another station via a wireless medium. The terms "wireless medium" and "channel" are often used interchangeably. A station may communicate with an access point or peer-to-peer with another station. A station may also be called, and may contain some or all of the functionality of, a terminal, a mobile station, a user equipment, a subscriber unit, etc. A station may be a cellular phone, a handheld device, a wireless device, a personal digital assistant (PDA), a laptop computer, a wireless modem, a cordless phone, etc. An access point is a station that can provide access to distribution services via the wireless medium for stations associated with the access point. An access point may also be called, and may contain some or all of the functionality of, a base station, a base transceiver station (BTS), a Node B, an evolved Node B (eNode B), etc.

Wireless network 100 may implement any radio technology in the IEEE 802.11 family of standards adopted by The Institute of Electrical and Electronics Engineers (IEEE). For example, wireless network 100 may implement IEEE 802.11 standard, including one or more of its addendum such as 802.11a, 802.11b, 802.11e and/or 802.11g. Wireless network 100 may also implement IEEE 802.11n and/or 802.11s, which are IEEE 802.11 standards being formed. IEEE 802.11, 802.11a, 802.11b, 802.11g and 802.11n cover different radio technologies and have different capabilities. IEEE 802.11e covers quality of service (QoS) enhancements for a Medium Access Control (MAC) layer.

Wireless network 100 may be an infrastructure network or an ad hoc network. An infrastructure network includes one or more access points and possibly other entities that support communication for stations. An infrastructure network is also referred to as a Basic Service Set (BSS) in IEEE 802.11. An ad hoc network is composed solely of stations within mutual communication range of each other via the wireless medium. An ad hoc network may be formed on the fly as needed, typically without a central controlling entity such as an access point, and may be dissolved when no longer needed. An ad hoc network is also referred to as an Independent BSS (IBSS) in IEEE 802.11. Much of the following description assumes that wireless network 100 is an ad hoc network.

Wireless network 100 may support one or more of the following power save modes or mechanisms:
  Unscheduled power save—data is transmitted whenever there is data to send during awake periods,
  Scheduled power save—data is transmitted at scheduled service times during awake periods, and
  Power Save Multi-Poll (PSMP)—data is transmitted to multiple stations with a single announcement frame during awake periods.

The unscheduled power save mode may also be referred to as a Power Save (PS) mode, an IBSS unscheduled power save mode, an Unscheduled Automatic Power Save Delivery (U-APSD) mode, etc. The scheduled power save mode may also be referred to as an IBSS scheduled power save mode, a Scheduled APSD (S-APSD) mode, etc. These power save modes allow stations to go to sleep and conserve battery power but operate in different manners, as described below.

Figure 2:
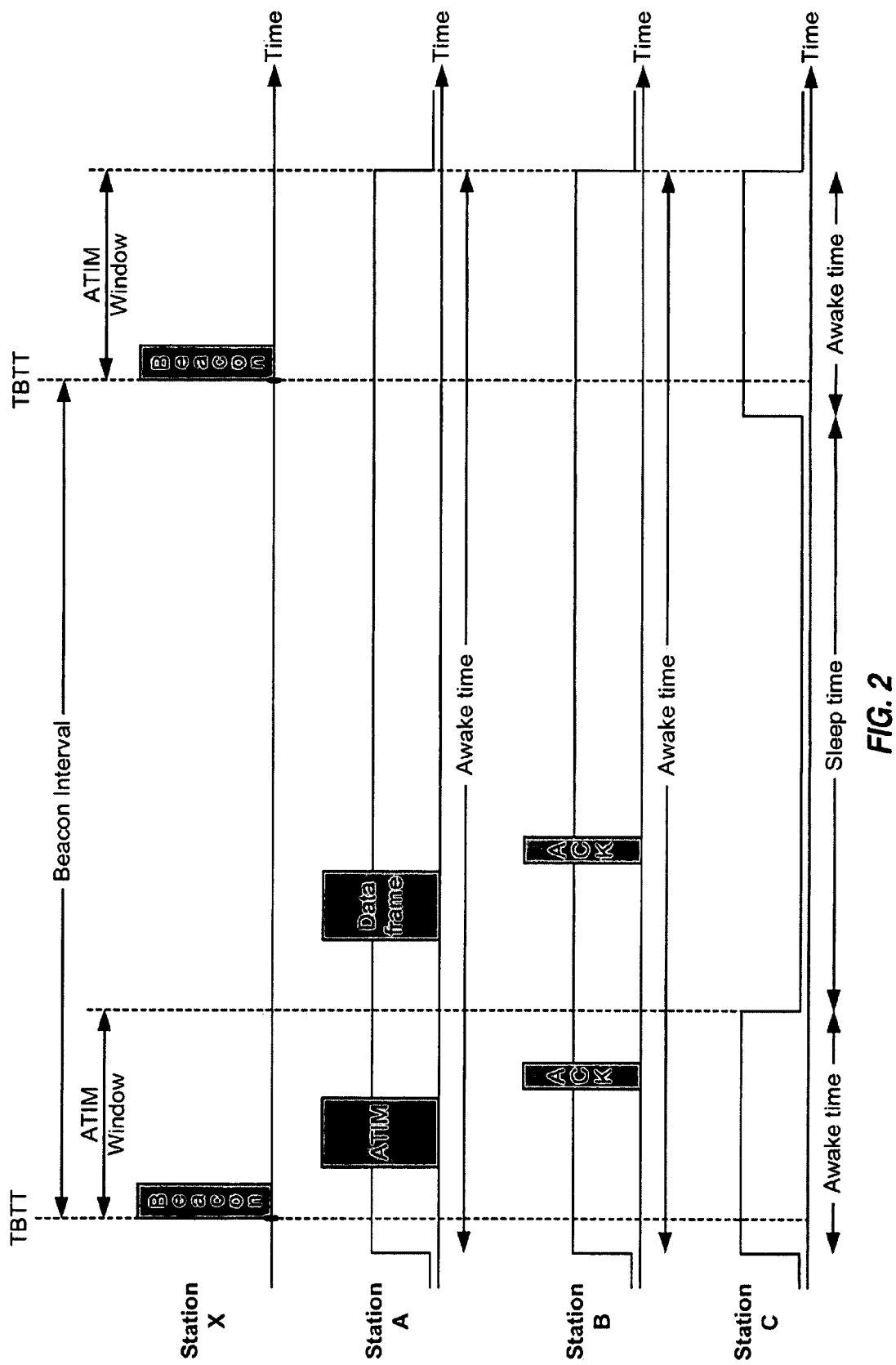
FIG. 2 shows transmission timelines for multiple stations.

FIG. 2 shows example transmission timelines for various stations 120 in wireless network 100. One station (e.g., station X in FIG. 1) may form the wireless network and may maintain timing for the wireless network. Station X may periodically transmit a beacon frame that allows other stations to detect and identify station X. The time at which a beacon frame should be transmitted is referred to as a target beacon transmit time (TBTT). The time interval between the start of two consecutive beacon frames is referred to as a beacon interval. The beacon interval may be set to a suitable duration, e.g., 100 milliseconds (ms) or some other interval. All stations in the wireless network may synchronize their timing to the beacon frames transmitted by station X.

Various types of frames may be transmitted in the time between the beacon frames. These frames may include management frames, control frames, data frames, etc. A data frame may also be referred to as a packet, a data block, a data unit, a protocol data unit (PDU), a service data unit (SDU), a MAC SDU (MSDU), a MAC PDU (MPDU), etc. Two stations may have one or more traffic streams and may exchange data frames for each traffic stream.

The unscheduled power save mode may be used in an ad hoc network (or IBSS) in IEEE 802.11. In this case, station X may select a suitable duration for an Announcement Traffic Indication Message (ATIM) window and may broadcast the ATIM window duration in each beacon frame. All stations in the wireless network, including those operating in the unscheduled power save mode, are required to be awake during each ATIM window in order to receive frames applicable for these stations. An ATIM window starts at a TBTT and ends when the ATIM window duration has elapsed.

Operation in the unscheduled power save mode may occur as follows. When a given station A has one or more data frames to transmit to another station B, station A may transmit an ATIM frame during an ATIM window to station B. All stations in the wireless network may receive the ATIM frame from station A. Station B may recognize that it is the recipient of the ATIM frame and that station A has data to transmit to station B. Station B may transmit an acknowledgement (ACK) for the ATIM frame. At the end of the ATIM window, stations that did not transmit or receive ATIM frames (e.g., station C) may go to sleep. Stations that transmit and/or receive ATIM frames may exchange data after the end of the ATIM window. In the example shown in FIG. 2, station A transmits a data frame to station B after the end of the ATIM window, and station B transmits an ACK for the data frame. Stations A and B may stay awake until the end of the beacon interval.

For the unscheduled power save mode in an ad hoc network in IEEE 802.11, all stations are required to be awake for the entire duration of each ATIM window. This ensures that the stations can notify each other of pending data for other stations. A source station may transmit an ATIM frame (as shown in FIG. 2) or a Request To Send (RTS) frame to each recipient station for which the source station has pending data during an ATIM window following a beacon frame. Stations that transmit ATIM or RTS frames and stations that receive ATIM or RTS frames are required to remain in an awake state until the end of the next ATIM window, as shown in FIG. 2. For stations that have traffic with low periodicity, requiring these stations to be awake for an entire beacon interval after receiving an indication of buffered traffic in the ATIM window may result in excessive battery power consumption. This extended awake time may be undesirable for stations that receive only a few data frames in the beacon interval and complete the reception of these data frames early in the beacon interval.

In an aspect, a source station may include a power save buffer status in an ATIM frame or an RTS frame sent to a recipient station. The power save buffer status may convey the amount of data (e.g., the number of data frames or MSDUs, or the number of data bytes or bits) to be sent to the recipient station. The recipient station would then know how much data (e.g., how many data frames) to expect from the source station. The recipient station may go to sleep after completing the reception of the expected amount of data (or number of data frames), instead of having to wait until the end of the next ATIM window, which may save battery power. For example, if the recipient station receives an ATIM frame or an RTS frame with the power save buffer status indicating two data frames, then the recipient station may go to sleep after receiving two data frames. The amount of buffered data may be given in number of bytes, which may be useful should fragmentation of MAC frame occur.

Figure 3:
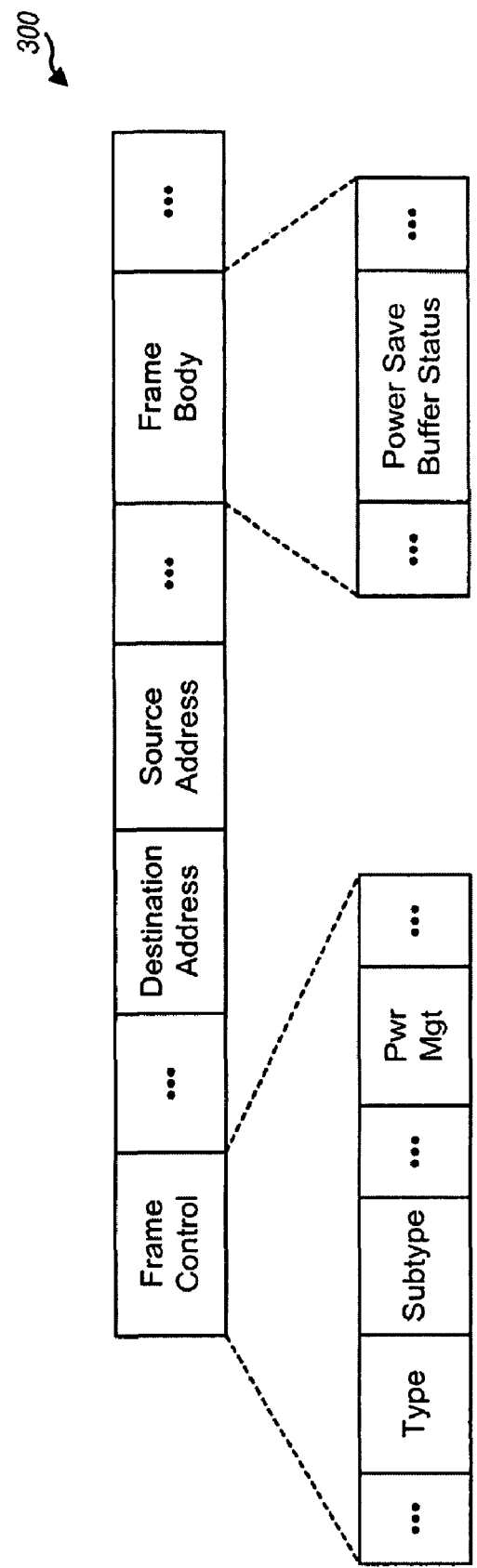
FIG. 3 shows a frame capable of conveying power save buffer status.

FIG. 3 shows a design of a frame 300 capable of conveying the power save buffer status. Frame 300 may be used for an ATIM frame, an RTS frame, etc. Frame 300 includes a Frame Control field that provides various pieces of information, a Destination Address field that identifies a recipient station of the frame, a Source Address field that identifies a source station transmitting the frame, a Frame Body field that includes a Power Save Buffer Status field, and possibly other fields that are not shown in FIG. 3 for clarity.

The Frame Control field includes a Type subfield, a Subtype field, a Power Management (Pwr Mgt) field, and other fields not shown in FIG. 3. The Type subfield may be set to '00' for a management frame or '01' for a control frame. The Subtype field may be set to '1001' for an ATIM frame, which is one type of management frame, or to '1011' for an RTS frame, which is one type of control frame. The Power Management field may be set to '1' to indicate that the station is in the power save mode or to '0' to indicate that the station is in an active mode.

For the ATIM and RTS frames, the Frame Body field is currently a null field that does not carry any information. In the design shown in FIG. 3, the Power Save Buffer Status field may be included in the Frame Body field and may indicate the number of data frames or MSDUs that the source station has buffered for the recipient station. The power save buffer status may also be provided in a subfield of the Frame Control field or may be sent in a management frame, a control frame, or a data frame in other manners.

In general, the power save buffer status may indicate the availability of buffered data (e.g., yes or no), the amount of buffered data, the number of buffered data frames or bytes, etc. The power save buffer status may be conveyed in an ATIM frame, an RTS frame, a data frame, or some other frame.

Figure 4:
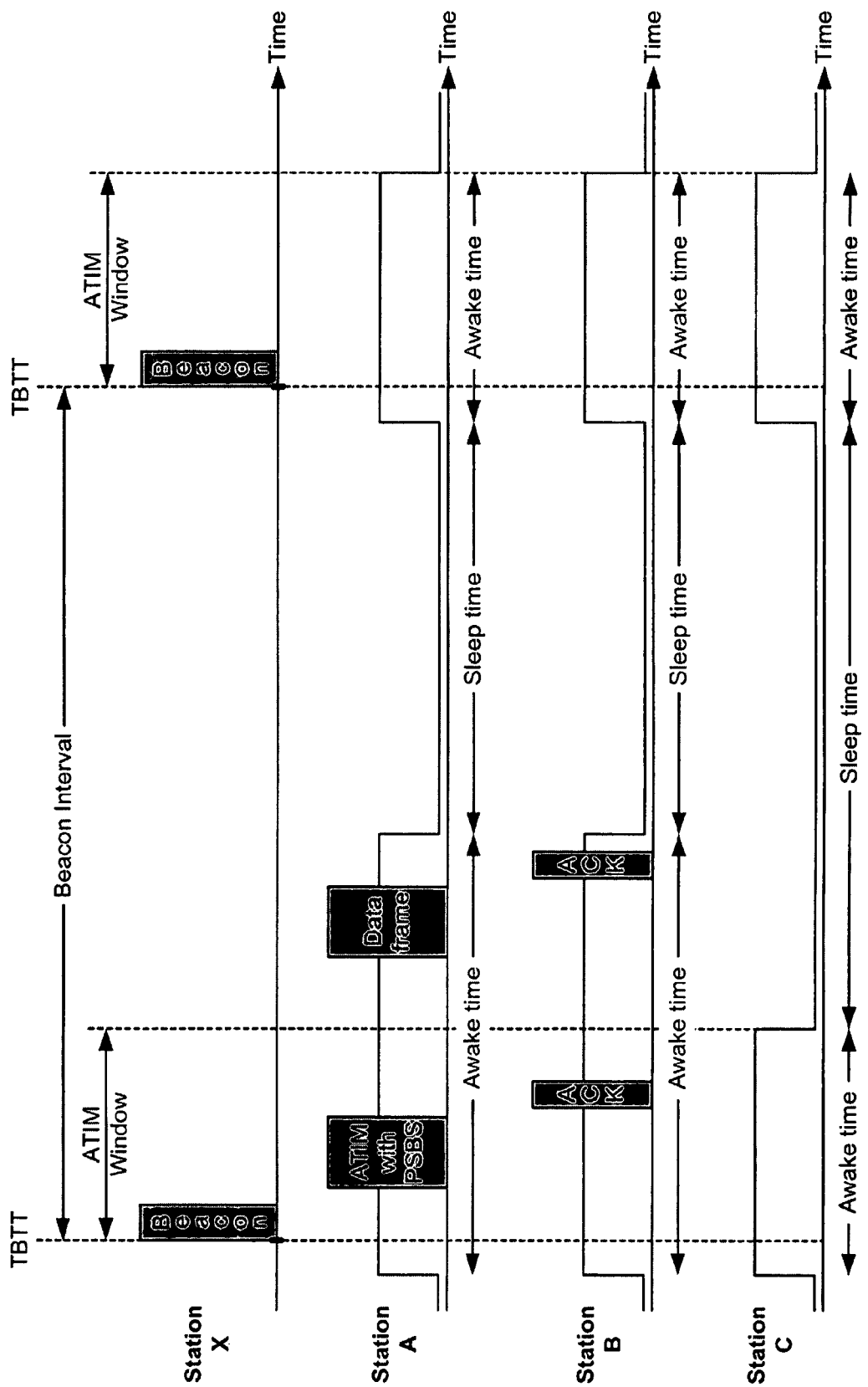
FIG. 4 shows operation in an unscheduled power save mode with the power save buffer status feature.

FIG. 4 shows an example operation in the unscheduled power save mode with the power save buffer status feature. In this example, station A has one data frame to transmit to station B. Station A transmits an ATIM frame during an ATIM window to station B. The ATIM frame includes a power save buffer status (PSBS) that indicates one data frame buffered for station B. Station B returns an ACK for the ATIM frame. In this example, no other ATIM frames are transmitted during the ATIM window. At the end of the ATIM window, stations A and B remain awake. Station C has not transmitted or received any ATIM frame and can thus go to sleep.

Based on the power save buffer status, station B expects to receive one data frame from station A. Station A transmits the data frame, and station B returns an ACK for the data frame. After receiving the data frame, station B does not expect to receive any more data from station A and can go to sleep after transmitting the ACK for the data frame. After transmitting the data frame, station A does not have any more data for station B and can go to sleep after receiving the ACK for the data frame. Thus, both stations A and B may go to sleep early instead of having to wait until the end of the next ATIM window.

Transmission of data over a wireless channel may be unreliable. Therefore, there may be cases where station A will not receive the ACK sent by station B after reception of the last data frame from station A. According to the channel access procedures, station A may retransmit the last data frame when an ACK is not received, and may assume that station B has not sent the ACK because it has not decoded the data frame. If station B goes to sleep, then station B will not decode the retransmissions. Station A may keep retransmitting until it reaches the maximum retry count, at which stage it will abort the transmission. This may result in excessive power drain for station A and waste of the wireless medium. Depending on the power capabilities of stations A and B, station B may opt to sleep as soon as possible after sending ACK for the last data frame (e.g., station B may be power limited and may not be concerned by station A's power supply), or station B may opt to stay awake for some amount of time after sending this ACK (e.g., stations A and B may both be power limited). Staying awake after sending the ACK for the last data frame would allow station B to send ACK(s) should station A retransmit after the original ACK was erased by the wireless channel. Station B may use the SIFS, DIFS, contention window size, wireless medium load, number of stations in the IBSS, etc., to estimate how long to stay awake in order to improve power saving by both stations A and B as well as to reduce network load. If station B receives duplicate frames, then only one is accounted for when deciding how long to stay awake.

In general, the source and recipient stations may negotiate a termination strategy in case the ACK for the last data frame (or any data frame) is not received by the source station. The recipient station may remain awake for an amount of time to receive possible retransmission from the source station, as described above. Alternatively, the source station may skip retransmission of the last data frame during the current awake period if the ACK is not received from the recipient station. Instead, the source station may retransmit this data frame in a subsequent awake period or may discard the data frame. This would then allow the recipient station to go to sleep right after sending the ACK for the last data frame. Other termination strategies may also be negotiated between the source and recipient stations.

A source station may have multiple data frames to transmit to a recipient station and may transmit one data frame at a time. For each data frame, the source station may perform channel access to gain access to the channel and may transmit the data frame via the channel upon gaining access.

Figure 5:
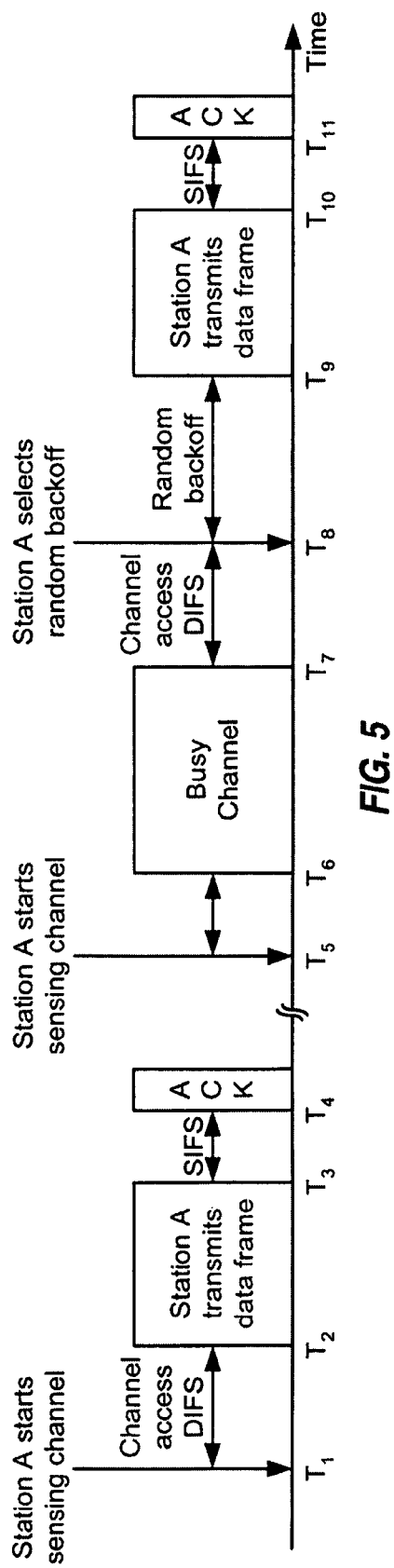
FIG. 5 shows transmission of data frames with separate channel accesses.

FIG. 5 shows transmission of multiple data frames by station A to station B with Distributed Coordination Function (DCF) in IEEE 802.11. Station A has data to transmit and starts sensing the channel at time $T_1$ to determine whether the channel is busy or idle. If the channel is idle for a period of time equal to a DCF interframe space (DIFS), then station A can transmit a data frame starting at time $T_2$, where $T_2-T_1 \geq DIFS$. Station B receives and decodes the data frame from station A. After the end of the data frame at time $T_3$, station B waits a short interframe space (SIFS) time and transmits an ACK starting at time $T_4$, where $T_4-T_3 \geq SIFS$. Since SIFS is shorter than DIFS, station B can access the channel before other stations after the end of the data frame. This ensures that station A can receive the ACK in a timely manner.

Station A has another data frame to transmit and starts sensing the channel at time $T_5$ to determine whether the channel is busy or idle. In this example, the channel is initially idle but becomes busy at time $T_6$. Station A may then wait until the channel becomes idle at time $T_7$ and may further wait for the channel to be idle for a DIFS period, which occurs at time $T_8$. Station A may then select a random backoff between zero and a contention window (CW). The random backoff is used to avoid a scenario in which multiple stations transmit simultaneously after sensing the channel idle for DIFS time. Station A then counts down the random backoff, pausing whenever the channel becomes busy and restarting the countdown after the channel is idle for DIFS time (not shown in FIG. 5). Station can transmit the data frame when the countdown reaches zero at time $T_9$. Station B receives and decodes the data frame from station A. After the end of the data frame at time $T_{10}$, station B waits SIFS time and transmits an ACK starting at time $T_{11}$, where $T_{11}-T_{10} \geq SIFS$.

As shown in FIG. 5, performing channel access for each data frame may extend the amount of time to transmit multiple data frames. This is because the channel can become busy during any channel access, and the source station would then need to contend for the channel with other stations. Each channel access adds access delay and ACK overhead. The extended transmission time for the multiple data frames may result in the source and recipient stations being awake longer.

In another aspect, a station capable of receiving multiple data frames in one TXOP can advertise this TXOP bursting receive capability to other stations. The TXOP bursting receive capability supports delivery of multiple data frames in one TXOP with a single channel access, which may shorten the amount of time to transmit the data frames.

A station may send a Capability Information field in an Association Request frame when the station joins the wireless network. The station may also send the Capability Information field in an ATIM frame or some other management frame. The Capability Information field may contain information on whether TXOP bursting reception is supported by the station and the number of data frames that can be received by the station in one TXOP, which may be given by an N-bit value (e.g., an 8-bit value). In one design, a value of all zeros may indicate that TXOP bursting reception is not supported. A value of all ones may indicate that the station can receive any number of data frames in one TXOP at the highest data rate. The remaining values may indicate the number of data frames that can be received per TXOP. In another design, the number of data frames that can be received per TXOP may be restricted to certain allowed values, e.g., 0, 1, 2, 4, and all ones, and all stations may be mandated to support this. In general, whether or not TXOP bursting is supported and the number of data frames that can be received per TXOP may be provided in one or more fields and using any format.

Figure 6A:
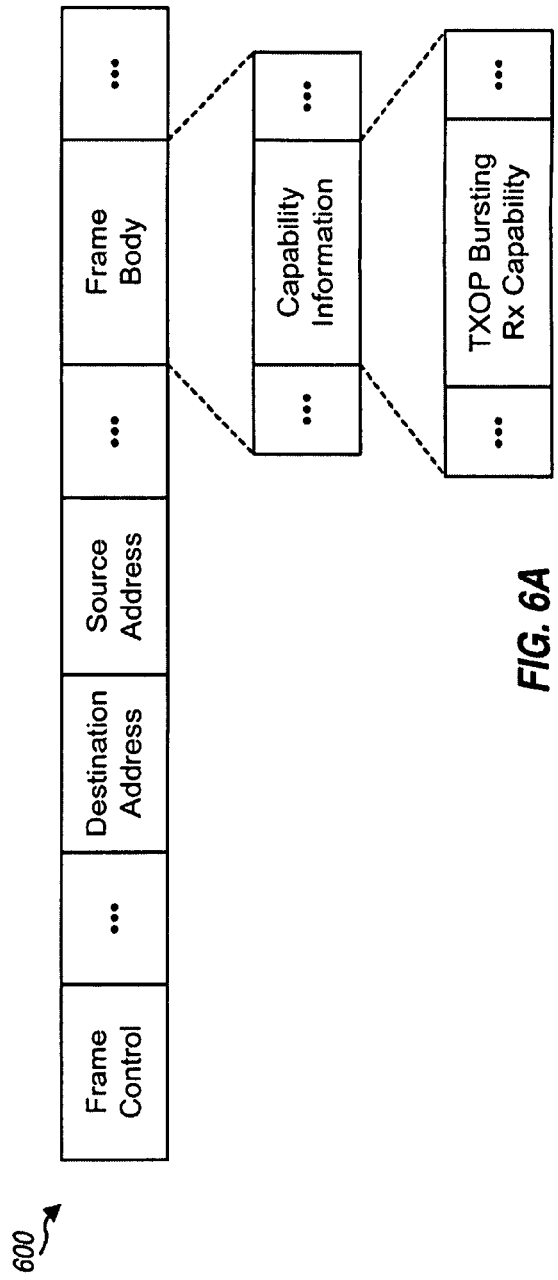
FIGS. 6A and 6B show frames capable of conveying TXOP bursting receive capability.

FIG. 6A shows a design of a frame 600 capable of conveying TXOP bursting receive capability. Frame 600 may be used for an Association Request frame, an Authentication frame, or some other management frame, control frame, or data frame. Frame 600 includes a Frame Control field, a Destination Address field, a Source Address field, a Frame Body field, and possibly other fields that are not shown in FIG. 6A for clarity. The Frame Body field includes a Capability Information field and possibly other fields that are not shown in FIG. 6A. The Capability Information field includes a TXOP Bursting Receive (Rx) Capability subfield that may be defined as described above. The TXOP bursting receive capability may also be conveyed as a separate field in the Frame Body field or may be sent in a management frame or a control frame in other manners. The TXOP bursting receive capability may also be sent in some other type of frame, e.g., in a first data frame sent by the source station.

Station X (which formed the ad hoc network) may receive TXOP bursting receive capabilities of other stations in the ad hoc network, e.g., during association by these stations. Station X may broadcast the TXOP bursting receive capabilities of these stations via beacon frames.

Figure 6B:
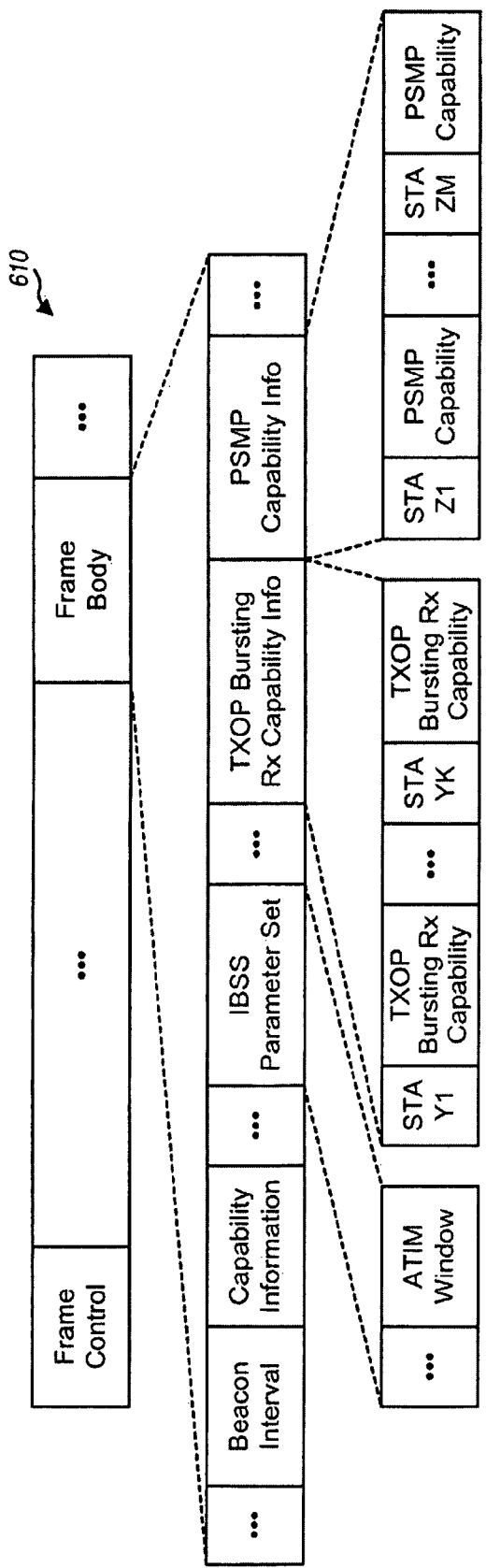

FIG. 6B shows a design of a beacon frame 610 capable of conveying TXOP bursting receive capabilities of stations in the ad hoc network. Beacon frame 610 includes a Frame Control field, a Frame Body field, and other fields that are not shown in FIG. 6B for clarity. The Frame Body field includes a Beacon Interval field that indicates the beacon interval, a Capability Information field that indicates the capabilities of station X, an IBSS Parameter Set field that indicates a set of parameters used to support the ad hoc network (e.g., the ATIM window duration), a TXOP Bursting Receive Capability Information field, and possibly other fields. The TXOP Bursting Receive Capability Information field may include one entry for each station whose TXOP bursting receive capability is broadcast in the beacon frame. The entry for each station may include a subfield for a station identifier or address (STA Yk) and a subfield for the TXOP bursting receive capability of that station. The TXOP bursting receive capabilities of the stations may also be broadcast in other manners and/or in other frames.

In yet another aspect, a station capable of transmitting multiple data frames in one TXOP can advertise this TXOP bursting transmit capability to other stations. The TXOP bursting transmit capability allows for transmission of multiple data frames in one TXOP with a single channel access. The TXOP bursting transmit capability may be conveyed and advertised in similar manner as the TXOP bursting receive capability.

Figure 7:
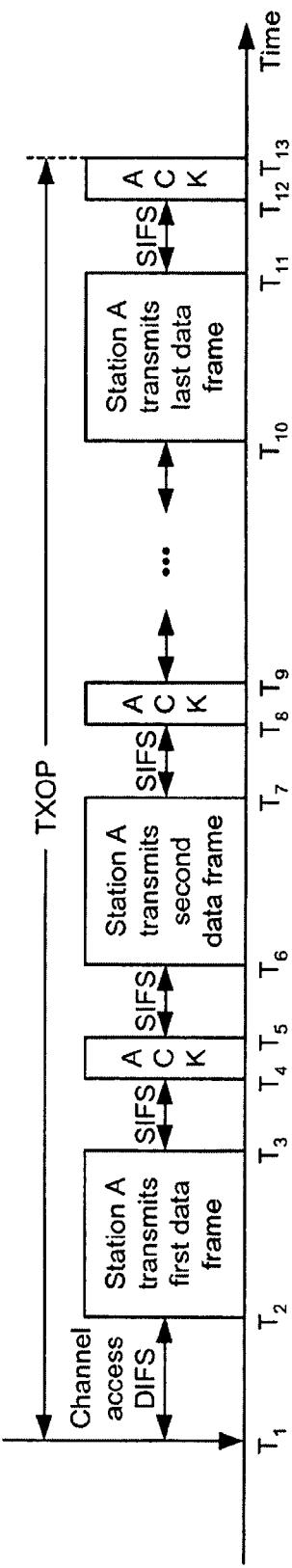
FIG. 7 shows transmission of data frames with TXOP bursting receive capability.

FIG. 7 shows transmission of multiple data frames by station A to station B with TXOP bursting capability. Station A has data to transmit and starts sensing the channel at time $T_1$. After sensing the channel idle for DIFS time, station A transmits the first data frame starting at time $T_2$. Station B receives and decodes the first data frame, waits SIFS time after the end of the first data frame at time $T_3$, and transmits an ACK starting at time $T_4$. Station A receives the ACK, waits SIFS time after the end of the ACK at time $T_5$, and transmits a second data frame starting at time $T_6$. Since SIFS is shorter than DIFS, station A can transmit the second data frame without contention from other stations that are waiting for the channel to be idle for DIFS time. Station B receives and decodes the second data frame, waits SIFS time after the end of the second data frame at time $T_7$, and transmits an ACK starting at time $T_8$. Any number of data frames and ACKs may be transmitted in similar manner, limited by the TXOP bursting receive capability of station B. At time $T_{10}$, which is SIFS time after the end of the prior ACK (not shown in FIG. 7), station A transmits the last data frame. Station B receives and decodes the last data frame, waits SIFS time after the end of the last data frame at time $T_{11}$, and transmits an ACK starting at time $T_{12}$.

As shown in FIG. 7, station A can transmit any number of data frames in one TXOP with one channel access, which may shorten the amount of time to transmit the data frames. This may allow both stations A and B to go to sleep earlier, which may save battery power. The TXOP burst may be for an aggregate packet such as an Aggregate MPDU (A-MPDU) in IEEE 802.11n.

In general, the power save buffer status and TXOP bursting features may be used separately or in combination. A combination of these two features may provide accurate information for a recipient station regarding an impending data transfer for this station. For example, if the power save buffer status indicates four pending data frames and the TXOP bursting receive capability indicates six data frames per TXOP, then the source station may send the four data frames in one TXOP. If the power save buffer status indicates four pending data frames and TXOP bursting reception is not supported, then the recipient station can receive one data frame at a time and go to sleep immediately or some time after receiving all four data frames.

The power save buffer status and/or the TXOP bursting feature may be used in conjunction with any of the power save modes listed above. These features may also be used independently of these power save modes.

For the unscheduled power save mode, a source station may include the power save buffer status for a recipient station in an ATIM frame or an RTS frame sent in an ATIM window, as shown in FIG. 4. The source station may transmit one or more data frames to the recipient station after the end of the ATIM window in each TXOP. The unscheduled power save mode with the power save buffer status and/or the TXOP bursting feature may be advantageously used by stations with aperiodic traffic or traffic that can tolerate some delay and jitter. The unscheduled power save mode with these features may also be used in other scenarios.

For the scheduled power save mode, two stations may negotiate to wake up at a fixed interval between beacon frames to transmit and/or receive data. This interval is referred to as a service period. The negotiation of the service period may be performed during IBSS setup, via traffic specification (TSPEC) setup for a traffic stream between the two stations, etc. Although scheduling in IBSS is currently not defined by IEEE 802.11, two stations may negotiate and schedule a service period using any mechanism. The service period negotiation may be in addition to the exchange of information for the power save buffer status and the TXOP bursting receive capability for each station.

Figure 8:
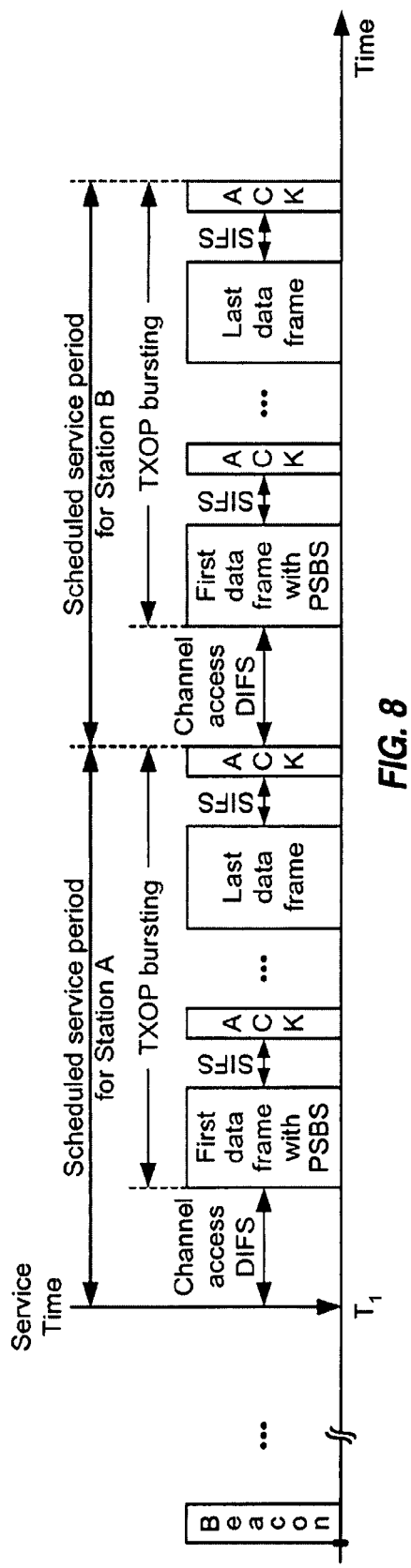
FIGS. 8 and 9 show operation in a scheduled power save mode and a PSMP mode, respectively, with the power save buffer status and TXOP bursting features.

FIG. 8 shows example operation in the scheduled power save mode with the power save buffer status and TXOP bursting features. In this example, stations A and B have negotiated a service time of $T_1$, and both stations wake up prior to the service time to exchange data.

At service time $T_1$, station A accesses the channel and transmits a first data frame to station B. This data frame may include the power save buffer status indicating the number of data frames that station A has buffered for station B. The TXOP bursting receive capability of station B may be made known to station A during service period negotiation. In any case, station B may have information on the number of data frames to expect from station A, and station A may have information on the TXOP bursting receive capability of station B. Station B returns an ACK for the first data frame. Station A then transmits remaining data frames to station B, e.g., using the TXOP bursting receive capability of station B as described above for FIG. 7.

Station B may then access the channel and transmit a first data frame to station A. This data frame may include the power save buffer status indicating the number of data frames that station B has buffered for station A or some other buffer information. The TXOP bursting receive capability of station A may be made known to station B during service period negotiation. In any case, station A may have information on the number of data frames to expect from station B, and station B may have information on the TXOP bursting receive capability of station A. Station A returns an ACK for the first data frame. Station B then transmits remaining data frames to station A, e.g., as described above for FIG. 7. Station A may go to sleep some time after sending an ACK for the last expected data frame. The time at which each station goes to sleep may be dependent on the wireless medium conditions, interframe spacing, etc.

In general, a data exchange during a service period may be either bi-directional with both stations transmitting data (as shown in FIG. 8) or uni-directional with only one station transmitting data. This may be dependent on the characteristics of the traffic stream and may be indicated during TSPEC setup.

The data exchange during each service period may follow the normal channel access rules. The station scheduled to transmit first (e.g., station A in FIG. 8) may perform channel access. The channel access may take a variable amount of time, which may be dependent channel load around the service time. The station scheduled to transmit second (e.g., station B in FIG. 8) may also perform channel access when it has data to transmit to the station that transmits first (as shown in FIG. 8) or may transmit an ACK after SIFS time from the end of the last data frame transmitted by the station that transmits first (not shown in FIG. 8).

FIG. 8 shows the use of the TXOP bursting feature by both stations A and B to transmit data. In general, each station may or may not use the TXOP bursting feature. Station A may transmit all of its data frames before station B transmits any data frame, as shown in FIG. 8. Alternatively, the two stations may transmit their data frames in an interlaced manner. For example, following the first data frame transmitted by station A, station B may transmit its first data frame along with the ACK for the data frame received from station A. Station A may then transmit its second data frame along with the ACK for the data frame received from station B.

When TXOP bursting is used, the receiving station may acknowledge data frames individually with ACK or may acknowledge several data frames with a Block ACK. Similar to ACK, the station that transmits Block ACK after receiving the last expected data frame may determine how long to stay awake after sending the Block ACK, in case the Block ACK is not received by the other station. Block ACK capability may be negotiated between the source and recipient stations.

Regardless of how the data frames may be transmitted, the power save buffer status may be used to determine whether there are more buffered data frames at the source station. If there are more buffered data frames, then the recipient station may wait to receive all data frames before going to sleep.

The scheduled power save mode with the power save buffer status and/or the TXOP bursting feature may be advantageously used by stations with various types of periodic traffic such as voice traffic, video traffic, gaming, etc. The scheduled power save mode with these features may also be used in other scenarios.

The PSMP mode allows an access point in an infrastructure network (or BSS) to announce a one-time upcoming schedule for uplink and downlink transmissions for multiple stations using a single frame. The access point may select a common service time for all stations to be aggregated. The access point may transmit a PSMP frame at the common service time. The PSMP frame may indicate a start time for each of the stations scheduled in the current PSMP service period. The access point may then service one station at a time and at the start time for that station. Each station may receive the PSMP frame, sleep until its start time as indicated by the PSMP frame, and wake up prior to its start time to exchange data with the access point. The PSMP service period covers the PSMP frame and subsequent frame exchanges for all scheduled stations. A single channel access may be performed by the access point at the common service time for the PSMP service period.

The PSMP capability may be used in an ad hoc network (or IBSS) to allow a source station to announce buffered data and possibly a schedule for multiple recipient stations. Station A (or any other station in the ad hoc network) may indicate its capability to generate and receive PSMP frames in the Capability Information field. Station A may exchange this information with station X (which is the station that forms the ad hoc network and periodically transmits beacon frames) during IBSS setup. Station X may broadcast the PSMP capabilities of other stations in the ad hoc network in the beacon frames. Alternatively or additionally, station A may convey its PSMP capability directly with other stations in the ad hoc network. Only stations capable of receiving PSMP frames are included in the PSMP service period.

FIG. 6B shows a design of beacon frame 610 capable of conveying the PSMP capabilities of stations in the ad hoc network. Beacon frame 610 includes a PSMP Capability Information field in the Frame Body field. The PSMP Capability Information field may include one entry for each station whose PSMP capability is broadcast in the beacon frame. The entry for each station may include a subfield for a station identifier or address (STA Zm) and a subfield for the PSMP capability of that station. The entry for each station may indicate if the station can transmit PSMP frames and/or if it can receive PSMP frames. The PSMP capabilities of the stations may also be broadcast in other manners and/or in other frames.

Figure 9:
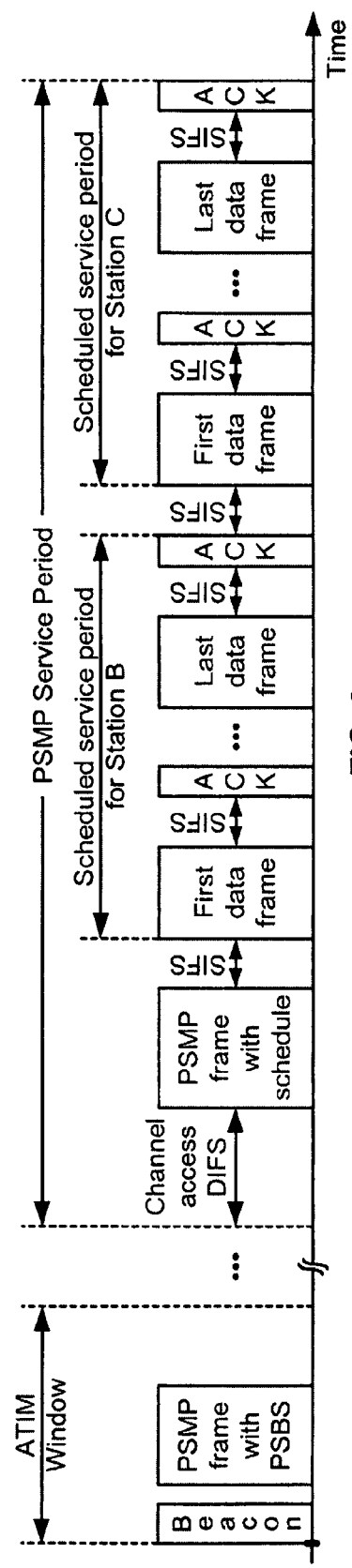

FIG. 9 shows example operation in the PSMP mode with the power save buffer status and TXOP bursting features. In this example, station A has buffered data for two recipient stations B and C and may transmit a PSMP frame (instead of multiple ATIM frames) following a beacon frame during an ATIM window. Since all stations in the ad hoc network have the same channel access priorities, station A may not be able to announce a schedule immediately following the beacon frame and maintain the schedule during the beacon interval. To alleviate this problem, a two-stage PSMP announcement may be used, as shown in FIG. 9.

Station A transmits a first PSMP frame following the beacon frame during the ATIM window. This PSMP frame may indicate the power save buffer status (PSBS) of each station for which station A has buffered data. The other stations may use the power save buffer status information to determine whether they should be awake to receive data from station A. The first PSMP frame may also indicate a PSMP service period, which is the time interval during the current beacon interval in which station A expects to service the stations identified in the first PSMP frame.

Station A transmits a second PSMP frame after the end of the ATIM window following a subsequent channel access. In one design, the second PSMP frame indicates a schedule for each station identified in the first and/or second PSMP frame. Station A then services one recipient station at a time and at the start time for that station. Station A may transmit to each recipient station using the TXOP bursting receive capability of that recipient station, which may be conveyed in any manner. Each recipient station may receive the second PSMP frame, sleep until its start time as indicated by the PSMP frame, and wake up prior to its start time to exchange data with station A. In another design, the second PSMP frame indicates the power save buffer status of the recipient stations and may not include the schedule. Station A may then transmit to each recipient station using the TXOP bursting receive capability of that recipient station. In general, the second PSMP frame may be used to announce a schedule or to transmit data to the recipient stations. Either an ACK or a Block ACK may be transmitted by the recipient station when TXOP bursting is enabled. The awake duration after transmitting the ACK or Block ACK after reception of last expected data frame may be chosen by the recipient station. Within the service period, the second PSMP frame allows more granularity of being able to save power. The information in the second PSMP frame may be used by other stations in the IBSS to defer channel access until the end of current PSMP period.

FIG. 10 shows a design of a process 1000 for transmitting data. A buffer status for a second station for which there is data to send may be determined at a first station (block 1012). The second station may operate in a power save mode in an ad hoc network, and the buffer status may indicate the number of data frames to send to the second station. A frame comprising the buffer status may be generated (block 1014) and sent from the first station to the second station during an awake time for both the first and second stations (block 1016). At least one data frame may be sent to the second station as indicated by the buffer status (block 1018).

The frame with the buffer status may be an ATIM frame or an RTS frame and may be sent during a window of time when the first and second stations are both awake, e.g., during an ATIM window as shown in FIG. 4. The frame with the buffer status may also be a PSMP frame comprising the buffer status for multiple stations for which there is data to send. The PSMP frame may be sent during an ATIM window or during a PSMP service period, e.g., as shown in FIG. 9. The frame with the buffer status may also be the first data frame sent during a service interval for the station, e.g., as shown in FIG. 8.

FIG. 11 shows a design of an apparatus 1100 for transmitting data. Apparatus 1100 includes means for determining at a first station a buffer status for a second station for which there is data to send (module 1112), means for generating a frame comprising the buffer status (module 1114), means for sending the frame from the first station to the second station during an awake time for both the first and second stations (module 1116), and means for sending at least one data frame to the second station as indicated by the buffer status (module 1118).

Figure 12:
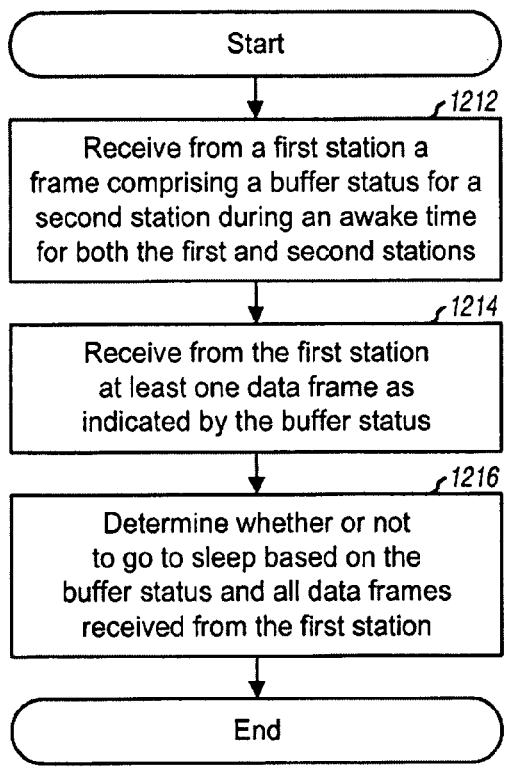
FIGS. 12 and 13 show a process and an apparatus, respectively, for receiving data with power save buffer status.

FIG. 12 shows a design of a process 1200 for receiving data. A frame comprising a buffer status for a second station may be received from a first station during an awake time for both the first and second stations (block 1212). At least one data frame may be received from the first station as indicated by the buffer status (block 1214). The second station may operate in a power save mode in an ad hoc network. Whether or not to go to sleep may be determined based on the buffer status and all data frames received from the first station (block 1216).

The frame with the buffer status may be an ATIM frame, an RTS frame, or a PSMP frame and may be received during an ATIM window in a beacon interval. The at least one data frame may be received after the ATIM window. The frame with the buffer status may also be a data frame and may be received during a service interval for the second station. Additional data frames, if any, may be received as indicated by the buffer status. In any case, the second station may go to sleep after receiving all data frames indicated by the buffer status and prior to the end of the beacon interval. The second station may send ACK or Block ACK for the received data frame(s) including the last expected data frame. The second station may go to sleep after receiving and acknowledging all data frames. The second station may also delay turning off its receiver chain to cope with a situation where its ACK or Block ACK is lost and some data frames are retransmitted by the first station.

Figure 13:
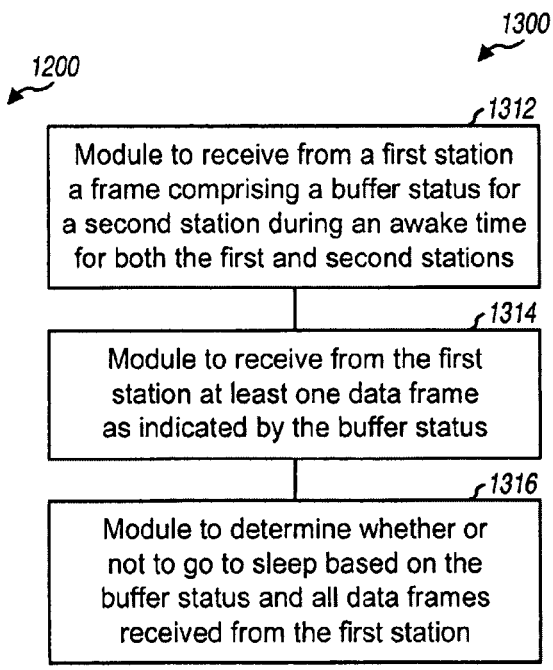

FIG. 13 shows a design of an apparatus 1300 for receiving data. Apparatus 1300 includes means for receiving from a first station a frame comprising a buffer status for a second station during an awake time for both the first and second stations (module 1312), means for receiving at least one data frame from the first station as indicated by the buffer status (module 1314), and means for determining whether or not to go to sleep based on the buffer status and all data frames received from the first station (module 1316).

FIG. 14 shows a design of a process 1400 for transmitting data. A frame comprising information on TXOP bursting receive capability of a second station operating in a power save mode may be received by a first station (block 1412). The information on the TXOP bursting receive capability may indicate the number of data frames that can be received by the second station in a single TXOP. The frame may be a management frame and may be received during association with the second station. The frame may also be a beacon frame and may be broadcast at a target beacon transmit time (TBTT).

The frame may also be a data frame sent by the second station. In any case, multiple data frames may be sent to the second station in a single TXOP based on the TXOP bursting receive capability of the second station (block 1414). For block 1414, channel access may be performed by the first station at the start of the TXOP. The multiple data frames may then be sent by the first station in the TXOP without performing another channel access, e.g., as shown in FIGS. 7 through 9.

FIG. 15 shows a design of an apparatus 1500 for transmitting data. Apparatus 1500 includes means for receiving at a first station a frame comprising information on TXOP bursting receive capability of a second station operating in a power save mode (module 1512), and means for sending multiple data frames to the second station in a single TXOP based on the TXOP bursting receive capability of the second station (module 1514).

FIG. 16 shows a design of a process 1600 for receiving data. A frame comprising information on TXOP bursting receive capability of a first station operating in a power save mode may be sent (block 1612). Multiple data frames, sent by a second station to the first station in a single TXOP based on the TXOP bursting receive capability of the first station, may be received (block 1614).

FIG. 17 shows a design of an apparatus 1700 for receiving data. Apparatus 1700 includes means for sending a frame comprising information on TXOP bursting receive capability of a first station operating in a power save mode (module 1712), and means for receiving multiple data frames sent by a second station to the first station in a single TXOP based on the TXOP bursting receive capability of the first station (module 1714).

Figure 18:
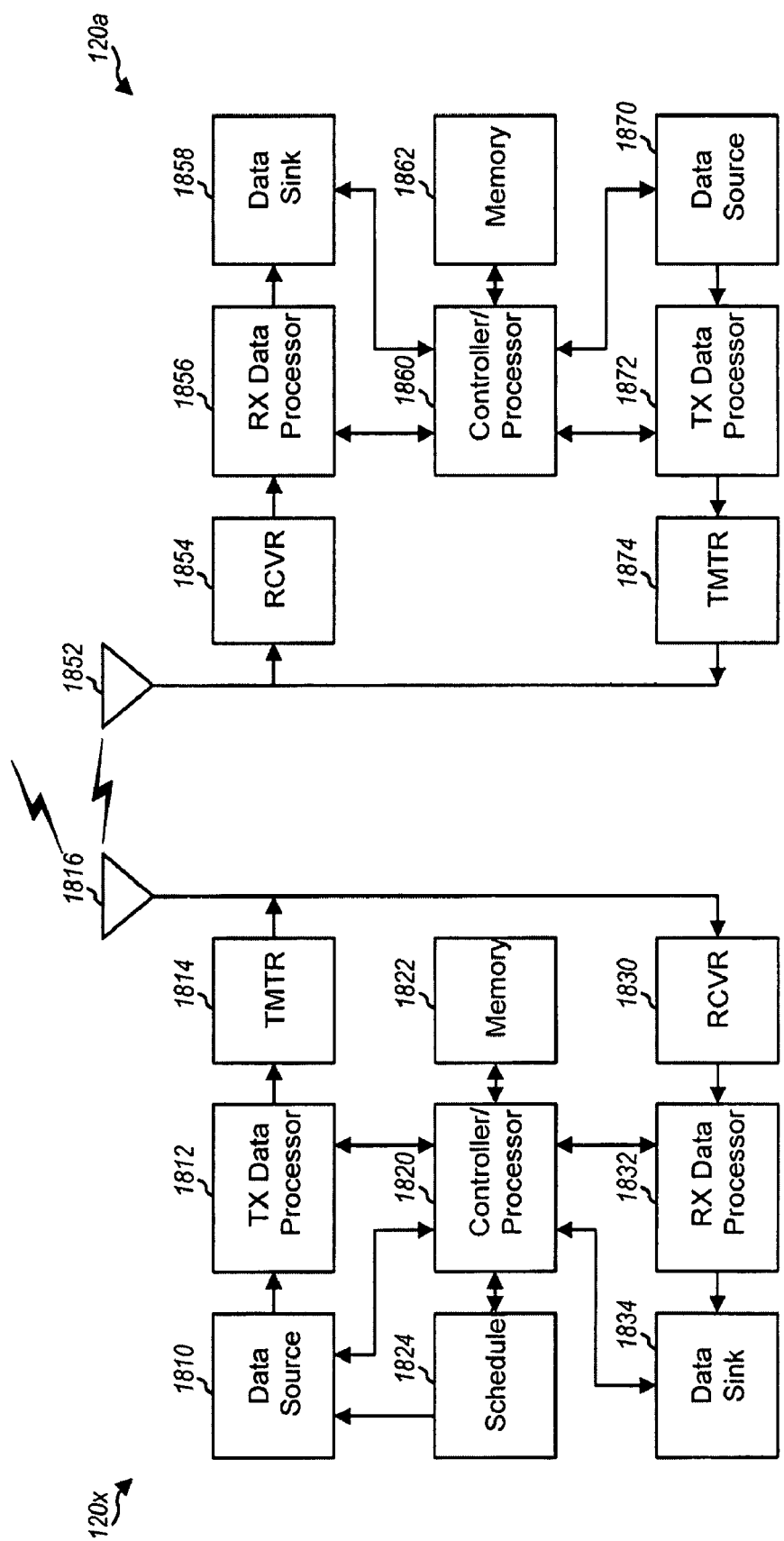
FIG. 18 shows a block diagram of two stations.

FIG. 18 shows a block diagram of a design of stations 120a and 120x in FIG. 1, which are two exemplary stations. At station 120x, a transmit (TX) data processor 1812 may receive traffic data from a data source 1810 for stations scheduled for transmission, control data from a controller/processor 1820, and scheduling information from a scheduler 1824 (e.g., if scheduling is utilized). The control data may comprise power save buffer status of stations to which data will be sent, TXOP bursting receive capabilities and/or PSMP capabilities of stations in the wireless network, and/or other information. In general, scheduling may or may not be utilized by each station. Frames may be transmitted between stations based on announcement of buffered data (e.g., using ATIM, RTS, and/or PSMP frames) and contention for the channel or based on other approaches. TX data processor 1812 may process (e.g., encode, interleave, modulate, and scramble) the data for each station based on a rate selected for that station, process control data and scheduling information, and generate output chips. A transmitter (TMTR) 1814 may process (e.g., convert to analog, amplify, filter, and frequency upconvert) the output chips and generate a modulated signal, which may be transmitted from an antenna 1816 to other stations.

At station 120a, an antenna 1852 may receive modulated signals from station 120x and/or other stations and may provide a received signal. A receiver (RCVR) 1854 may process the received signal and provide samples. A receive (RX) data processor 1856 may process (e.g., descramble, demodulate, deinterleave, and decode) the samples, provide decoded data for station 120a to a data sink 1858, and provide control data and scheduling information to a controller/processor 1860.

At station 120a, a TX data processor 1872 may receive traffic data from a data source 1870 and control data (e.g., power save buffer status, TXOP bursting receive capability, PSMP capability, etc.) from controller/processor 1860. TX data processor 1872 may process the traffic and control data for each recipient station based on a rate selected for that station and generate output chips. A transmitter 1874 may process the output chips and generate a modulated signal, which may be transmitted from antenna 1852 to other stations.

At station 120x, antenna 1816 may receive modulated signals from station 120a and/or other stations. A receiver 1830 may process a received signal from antenna 1816 and provide samples. An RX data processor 1832 may process the samples and provide decoded data for each station to a data sink 1834 and provide control data to controller/processor 1820.

Controllers/processors 1820 and 1860 may direct the operation at stations 120x and 120a, respectively. Controller/processor 1820 and/or 1860 may also perform process 1000 in FIG. 10, process 1200 in FIG. 12, process 1400 in FIG. 14, process 1600 in FIG. 16, and/or other processes for the techniques described herein. Memories 1822 and 1862 may store program codes and data for stations 120x and 120a, respectively. Scheduler 1824 may perform scheduling for stations based on any of the designs described above.

The techniques described herein may be implemented by various means. For example, the techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions/code may be stored in a memory (e.g., memory 1822 or 1862 in FIG. 18) and executed by a processor (e.g., processor 1820 or 1860). The memory may be implemented within the processor or external to the processor. The firmware and/or software instructions/code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The instructions/code may be executable by one or more processors and may cause the processor(s) to perform certain aspects of the functionality described herein.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured
to determine at a first station a buffer status for a second station for which there is data to send, wherein the first station and the second station are part of an ad hoc network,
to generate, at the first station, a frame comprising the buffer status, wherein the buffer status indicates an amount of data that the first station has buffered for sending to the second station,
to send the frame from the first station to the second station during an awake time for both the first and second stations,
to send at least one data frame to the second station, to receive acknowledgment of the at least one data frame, and to go to sleep after receiving acknowledgment of the at least one data frame; and
a memory coupled to the at least one processor.

2. The apparatus of claim 1, wherein the second station operates in a power save mode.

3. The apparatus of claim 1, wherein the frame is an Announcement Traffic Indication Message (ATIM) frame or a Request To Send (RTS) frame.

4. The apparatus of claim 1, wherein the frame is a data frame, and wherein the at least one processor is configured to send the data frame during a service interval for both the first and second stations.

5. The apparatus of claim 1, wherein the frame is a Power Save Multi-Poll (PSMP) frame, and wherein the buffer status is for multiple stations for which there is data to send.

6. The apparatus of claim 1, wherein the at least one processor is configured to retransmit each data frame for which acknowledgment is not received.

7. The apparatus of claim 6, wherein the at least one processor is also configured to skip retransmission of one or more data frames for which acknowledgment is not received, and to retransmit the one or more data frames in a subsequent awake time for both the first and second stations.

8. A computer program product, comprising:
a non-transitory computer-readable medium comprising:
code for causing a computer to determine at a first station a buffer status for a second station for which there is data to send, wherein the first station and the second station are part of an ad hoc network;
code for causing the computer to generate, at the first station, a frame comprising the buffer status, wherein the buffer status indicates an amount of data that the first station has buffered for sending to the second station;
code for causing the computer to send the frame from the first station to the second station during an awake time for both the first and second stations;
code for causing the computer to send at least one data frame to the second station;
code for causing the computer to receive acknowledgment of the at least one data frame; and
code for causing the computer to go to sleep after receiving acknowledgment of the at least one data frame.

9. A method of wireless communication, comprising:
determining at a first station a buffer status for a second station for which there is data to send, wherein the first station and the second station are part of an ad hoc network;
generating, at the first station, a frame comprising the buffer status, wherein the buffer status indicates an amount of data that the first station has buffered for sending to the second station;
sending the frame from the first station to the second station during an awake time for both the first and second stations;
sending at least one data frame to the second station;
receiving acknowledgment of the at least one data frame; and
going to sleep after receiving acknowledgment of the at least one data frame.

10. The method of claim 9, wherein the frame is an Announcement Traffic Indication Message (ATIM) frame or a Request To Send (RTS) frame.

11. A computer program product, comprising:
a non-transitory computer-readable medium comprising:
code for causing a computer to receive at a first station a frame comprising information on whether transmission opportunity (TXOP) bursting receive capability of a second station operating in a power save mode is supported and, if TXOP bursting receive capability is supported, a number of data frames that can be received by the second station in one TXOP; and
code for causing the computer to send multiple data frames in a single TXOP to the second station based on the TXOP bursting receive capability of the second station, wherein the multiple data frames are sent in the single TXOP without more than one channel access being performed during the single TXOP.

12. An apparatus for wireless communication, comprising:
means for determining at a first station a buffer status for a second station for which there is data to send, wherein the first station and the second station are part of an ad hoc network;
means for generating a frame, at the first station, comprising the buffer status, wherein the buffer status indicates an amount of data that the first station has buffered for sending to the second station;
means for sending the frame from the first station to the second station during an awake time for both the first and second stations;
means for sending at least one data frame to the second station;
means for receiving acknowledgment of the at least one data frame; and
means for going to sleep after receiving acknowledgment of the at least one data frame.

13. The apparatus of claim 12, wherein the frame is an Announcement Traffic Indication Message (ATIM) frame or a Request To Send (RTS) frame.

14. An apparatus for wireless communication, comprising:
at least one processor configured
to send a frame comprising information on whether transmission opportunity (TXOP) bursting receive capability of a first station operating in a power save mode is supported and, if TXOP bursting receive capability is supported, a number of data frames that can be received by a second station in one TXOP, and
to receive multiple data frames sent by the second station in a single TXOP to the first station based on the TXOP bursting receive capability of the first station, wherein the multiple data frames are received in the single TXOP without more than one channel access being performed during the single TXOP; and
a memory coupled to the at least one processor.

15. The apparatus of claim 14, wherein the frame is a management frame, and wherein the at least one processor is configured to send the management frame during association with another station in a wireless network.

16. An apparatus for wireless communication, comprising:
at least one processor configured
to receive from a first station a frame comprising a buffer status for a second station, wherein the buffer status indicates an amount of data that the first station has buffered for sending to the second station, and wherein the first station and the second station are part of an ad hoc network,
to receive at least one data frame from the first station as indicated by the buffer status,
to acknowledge receipt of the at least one data frame, and
to go to sleep after acknowledging receipt of the at least one data frame; and
a memory coupled to the at least one processor.

17. The apparatus of claim 16, wherein the second station operates in a power save mode, and wherein the at least one processor is configured to determine whether to go to sleep based on the buffer status and all data frames received from the first station.

18. The apparatus of claim 16, wherein the frame is an Announcement Traffic Indication Message (ATIM) frame or a Request To Send (RTS) frame, and wherein the at least one processor is configured to receive the frame during an ATIM window in a beacon interval, to receive the at least one data frame after the ATIM window, and to determine whether to go to sleep after receiving the at least one data frame.

19. The apparatus of claim 16, wherein the frame is a data frame, and wherein the at least one processor is configured to receive the data frame from the first station during a service interval for the second station, to receive any additional data frames as indicated by the buffer status, and to determine whether to go to sleep after receiving all data frames indicated by the buffer status.

20. The apparatus of claim 16, wherein the frame is a Power Save Multi-Poll (PSMP) frame, and wherein the at least one processor is configured to receive the PSMP frame from the first station during an Announcement Traffic Indication Message (ATIM) window, and to receive the at least one data frame after the ATIM window.

21. The apparatus of claim 16, wherein the at least one processor is configured to remain awake for an amount of time after acknowledging receipt of the at least one data frame to receive possible retransmission due to acknowledgment reception failure by the first station, and to go to sleep after the amount of time has elapsed.

22. The apparatus of claim 21, wherein the amount of time to remain awake after acknowledging receipt of the at least one data frame is configurable.

23. An apparatus for wireless communication, comprising:
at least one processor configured
to receive at a first station a frame comprising information on whether transmission opportunity (TXOP) bursting receive capability of a second station operating in a power save mode is supported and, if TXOP bursting receive capability is supported, a number of data frames that can be received by the second station in one TXOP, and
to send multiple data frames in a single TXOP to the second station based on the TXOP bursting receive capability of the second station, wherein the multiple data frames are sent in the single TXOP without more than one channel access being performed during the single TXOP; and
a memory coupled to the at least one processor.

24. The apparatus of claim 23, wherein the frame is a data frame received from the second station.

25. The apparatus of claim 23, wherein the at least one processor is configured to perform channel access at start of the TXOP.

26. The apparatus of claim 23, wherein the frame is a beacon frame, and wherein the at least one processor is configured to receive the beacon frame from a third station at a target beacon transmit time (TBTT).

27. An apparatus for wireless communication, comprising:
means for receiving at a first station a frame comprising information on whether transmission opportunity (TXOP) bursting receive capability of a second station operating in a power save mode is supported and, if TXOP bursting receive capability is supported, a number of data frames that can be received by the second station in one TXOP; and
means for sending multiple data frames in a single TXOP to the second station based on the TXOP bursting receive capability of the second station, wherein the multiple data frames are sent in the single TXOP without more than one channel access being performed during the single TXOP.

28. The apparatus of claim 27, wherein the frame is a beacon frame, and wherein the means for receiving the frame comprises means for receiving the beacon frame from a third station at a target beacon transmit time (TBTT).

29. The apparatus of claim 27, wherein the means for sending the multiple data frames comprises means for performing channel access at start of the TXOP.

30. A method of wireless communication, comprising:
receiving at a first station a frame comprising information on whether transmission opportunity (TXOP) bursting receive capability of a second station operating in a power save mode is supported and, if TXOP bursting receive capability is supported, a number of data frames that can be received by the second station in one TXOP; and
sending multiple data frames in a single TXOP to the second station based on the TXOP bursting receive capability of the second station, wherein the multiple data frames are sent in the single TXOP without more than one channel access being performed during the single TXOP.

31. The method of claim 30, wherein the sending the multiple data frames comprises performing channel access at start of the TXOP.

32. The method of claim 30, wherein the frame is a beacon frame, and wherein the receiving the frame comprises receiving the beacon frame from a third station at a target beacon transmit time (TBTT).

* * * * *